Figure 1:
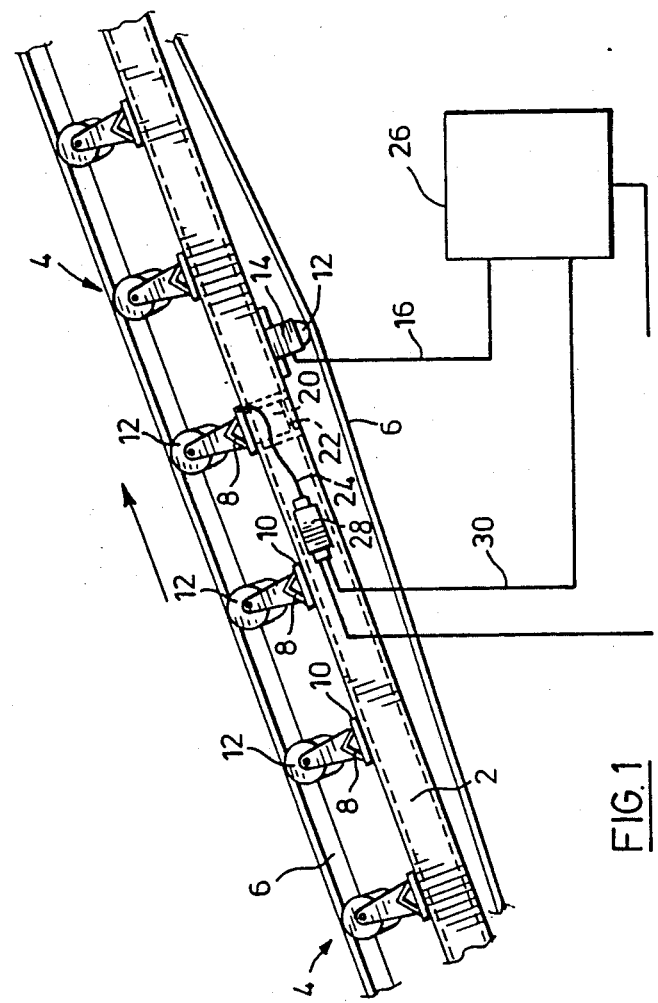

United States Patent [19]

Matteau et al.

[11] Patent Number: 4,788,930
[45] Date of Patent: Dec. 6, 1988

[54] WEIGH BRIDGE FOR VARIABLE INCLINATION CONVEYOR

[75] Inventors: Luc C. Matteau; Ralph D. Closs, both of Peterborough, Canada

[73] Assignee: Canadian Corporate Management Company Limited, Peterborough, Canada

[21] Appl. No.: 112,445

[22] Filed: Oct. 26, 1987

[51] Int. Cl.⁴ .................... G01G 11/14; G01G 13/02
[52] U.S. Cl. ..................................... 177/16; 177/119
[58] Field of Search ...................... 177/16, 119–121, 177/136, 145

[56] References Cited

U.S. PATENT DOCUMENTS

| | | | |
|---|---|---|---|
| 3,513,921 | 5/1970 | Refer | 177/16 |
| 4,108,344 | 8/1978 | Dahlberg | 177/16 X |
| 4,258,811 | 3/1981 | Franzon et al. | 177/200 |
| 4,507,742 | 3/1985 | Bateman | 177/136 X |
| 4,682,664 | 7/1987 | Kemp | 177/16 |

*Primary Examiner*—George H. Miller, Jr.
*Attorney, Agent, or Firm*—Ridout & Maybee

[57] ABSTRACT

A weigh scale for a variable inclination conveyor includes an idler or other support for part of an upper belt run of the conveyor, the support being associated with sensors for determining loadings applied to the belt run perpendicular to the direction of the conveyor, and a compensating unit receiving the sensor output calculating the weight of material on the conveyor causing the loading, the unit including a clinometer, and a computing device for causing the sensor output to be modulated by the secant of the angle of the conveyor to the horizontal as sensed by the clinometer.

4 Claims, 2 Drawing Sheets

WEIGH BRIDGE FOR VARIABLE INCLINATION CONVEYOR

This invention relates to conveyor weigh scales or weight bridges, used to provide a signal representing the instantaneous loading of material on a moving conveyor belt run, which signal can be processed to provide the rate of material flow or a total weight of material conveyed.

Usually such weigh bridges are installed under level portions of the belt, although some designs of weigh bridge can be installed under inclined belt segments provided that appropriate adjustments are made during installation and calibration to compensate for the fact that the weight of the material does not act perpendicularly to the conveyor run, and that components of force will be developed acting both longitudinally of the conveyor and perpendicular to it.

In U.S. Pat. No. 4,682,664, there is disclosed a weigh bridge unit for use in a conveyor weigh scale which has a support for part of the conveyor belt, such as a trough or one or more idlers, a bridge carrying the support, and load cells formed by cantilever strain gauge bridge units supporting the ends of the bridge, the electrical outputs of the bridge units being summed to provide a weigh bridge output signal. Cantilever arms of the load cell bridge units preferably extend in the direction of movement of the belt. Particular advantages of the preferred embodiment of this unit are that it is short in length, robust, has low hysteresis and in particular is sensitive only to forces acting perpendicular to the direction of movement of the belt. It is thus particularly suitable for use in conjunction with inclined belts.

Whilst it is thus known to use weigh bridges in conjunction with inclined belt runs, the location of such runs is fixed, and appropriate adjustments are made during installation. There are however applications in which it would be desirable to be able to weigh material passing over a conveyor whose inclination is not fixed. An example of such an application is in mobile conveyor units which are used in such locations as gravel pits to transfer aggregates from a hopper or treatment plant into trucks for transportation. Such units include a conveyor whose height and inclination are adjustable through a substantial range. Such units typically operate under extremely arduous conditions. It would however be very desirable to be able to record reliably the amount of material loaded by such a unit.

U.S. Pat. No. 3,513,921 discloses a conveyor belt scale in which the weighing mechanism is arranged so as to be insensitive to different inclinations of the conveyor belt, the weighing mechanism remaining horizontal. However, the system must be set up for a specific belt angle (see column 4, lines 5-18).

U.S. Pat. No. 4,258,811 (Franzon et al) discloses a weighing machine capable of maintaining an accurate output despite inclination of the mechanism. This is achieved by duplicating the weighing system, one system being responsive to an unknown mass and the other to a known calibration mass. Both weighing mechanisms are subject to equal inclination, and therefore the ratio of their outputs will remain constant, enabling the unknown mass to be determined. The mechanism described is intended for static weighing operation, and the necessary duplication of the weighing mechanism is an obvious economic disadvantage.

The present invention sets out to provide a conveyor weigh scale which can be utilized at differing or even changing inclinations of the conveyor to which it is applied whilst maintaining its calibration.

According to the invention, a conveyor weigh scale comprises a weigh bridge supporting a portion of the run of moving conveyor belt and secured to structure for supporting same at a range of different inclinations, said weigh bridge providing an output signal proportional to that component of said belt portion which is perpendicular to its direction of movement, a clinometer secured to said supporting structure and providing an output related to the inclination to the horizontal of said structure and thus said belt portion, and computing means receiving said clinometer signals and modulating said weigh bridge output signal to maintain said weigh bridge output signal in constant proportion to the weight of said material. Preferably the weigh bridge is of the type disclosed in U.S. Pat. No. 4,682,664, not only because its compactness and robustness make it particularly suitable for use in the arduous conditions under which a portable or variable inclination conveyor usually operates, but also because it has a very high rejection of signals due to force components acting otherwise than perpendicular to the conveyor belt.

Further features of the invention will become apparent from the following description of a preferred embodiment.

Figure 2:
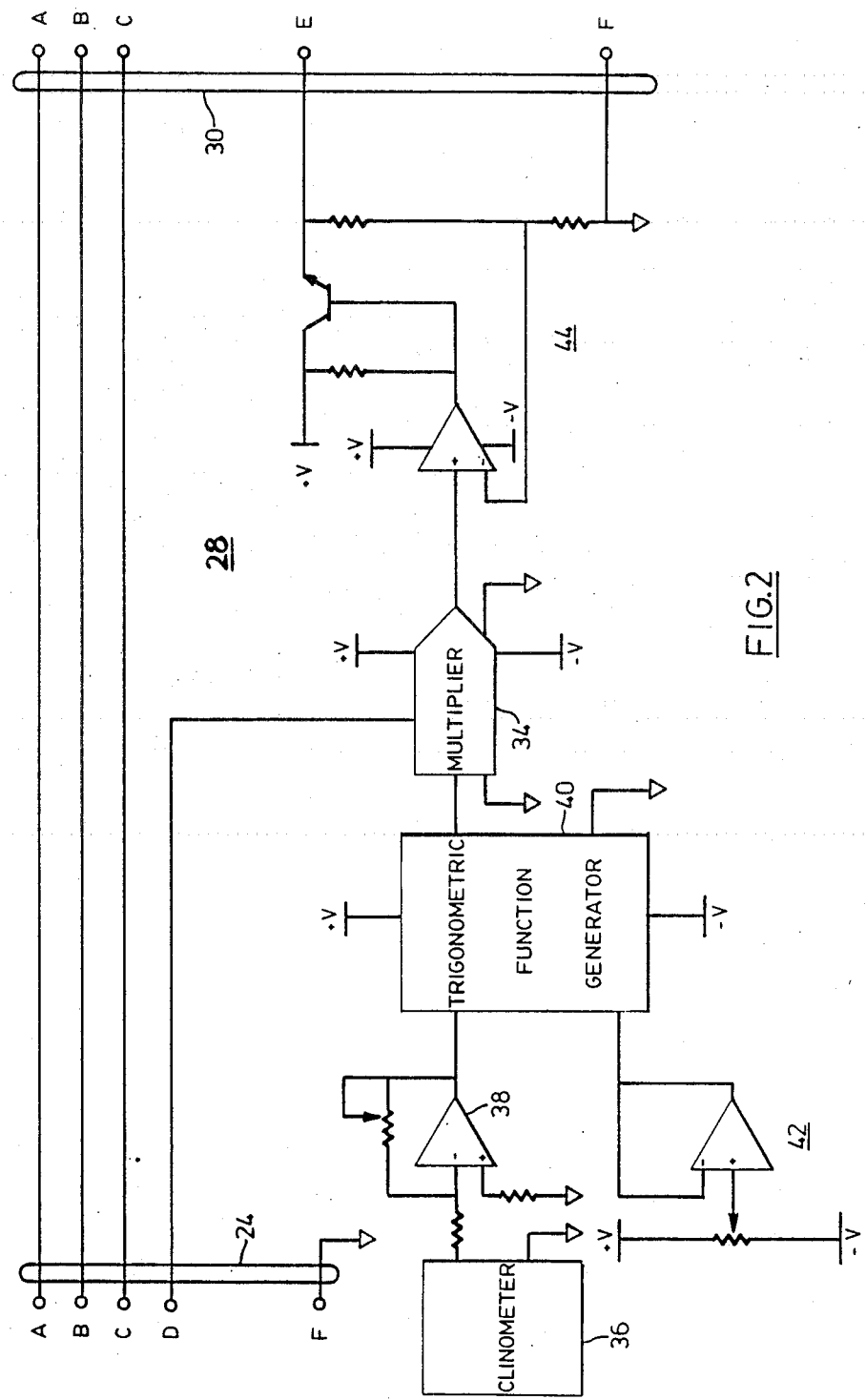

In the drawings:

FIG. 1 is a diagrammatic drawing showing an intermediate portion of a variable inclination conveyor; and FIG. 2 is a schematic diagram of a compensator unit mounted on the conveyor.

The conveyor frame is supported for tilting and vertical movement relative to a chassis for adjusting it to a required elevation and inclination. Such arrangements are well known in the art, form no part of the invention, and are not shown. The conveyor comprises spaced longitudinal stringers 2 between which extend carrier idlers 4 supporting an upper run of a belt 6. Typically the idlers comprise an angle section cross member 8 mounted by end brackets 10 to the stringers 2, and supporting a group of, typically three, rollers 12 which support the belt in an appropriate trough shape. The conveyor also includes various other conventional components such as head and tail pulleys, a drive motor, a device for taking up slack in the belt, and idler rolls supporting the return run of the belt. A bend pulley 12 in the return run of the belt 6 is associated with a tachometer of other speed sensor 14 which produces an electrical output signal on a cable 16.

One (in the example shown) of the idlers 4 is replaced by a weigh bridge unit 18 as described with reference to FIGS. 1, 2 and 5 of U.S. Pat. No. 4,682,664 (Kemp) and sold by Milltronics under the designation MSI, which receives an electrical excitation potential and provides electrical output signals on a mutli-conductor cable 24. The unit 18 differs from the idlers 4 essentially in that its cross member 8 is not supported directly by the end brackets 10, but instead the ends of the cross member are supported by cantilever strain gauses 20 above a further cross member 22 extending between the brackets. Strain gauge bridges in the strain gauges receive the excitation potential (as shown in more detail in FIG. 5 of the Kemp patent) and provide outputs to the cable 24.

As in a conventional conveyor weigh bridge installation, the outputs of the weigh bridge unit 18 in cable 24, as well as the output of the speed sensor 14, are connected by a cable 30 directly to a belt scale integrator unit 26, such as the unit sold under the trade mark COMPUSCALE by Milltronics, so as to provide outputs indicative of the total and/or rate of conveyance of material. In the present instance, however, an excitation potential on cable 30 is modified in a compensator unit 28 attached to a stringer of the conveyor unit, before being passed to the cable 24.

The compensator unit 28 is shown in more detail in FIG. 2. Separate signal lines A and B from the two strain gauges and a common signal line C pass straight through the unit to a weigh bridge preamplifier in the unit 26. A power supply, now shown, powered form an available alternating current or direct current supply according to application, provides positive and negative supplies V+, V− for powering the various components of the units. The excitation potential from the cable 30 appears between line D and a ground line F, line D being connected to one input of a multiplier 34, for example a 4214 multiplier/divider package from Burr-Brown, connected to provide a multiplication function. The other input receives a signal proportional to the secant of the inclination of the conveyor to the vertical, generated in this case by an electronic clinometer 36 secured in the unit 28 so as to have a fixed relationship to the conveyor stringers. A preamplifier 38 receives the clinometer output and has variable gain to permit calibration and provide a suitable output level, and a trigonometric function generator 40 receives the amplifier output and is connected so as to produce an output signal proportional to the secant of the angle to the horizontal sensed by the clinometer. A variable reference voltage generated by a reference voltage source 42 enables the clinometer signal at zero inclination to be balanced. The output of the multiplier is buffered by an output amplifier 44, so as to provide an output signal on line E representing the excitation potential on line D modulated according to the inclination of the conveyor. This modulation provides corresponding modulation of the output signals on lines A and B. The unit 28 is calibrated by adjusting the reference source 42 and the gain of the amplifier 38 so that the ouput of generator 40, and thus the excitation potential on line E relative to line F is a minimum when the conveyor is horizontal, and the output of the strain gauges is maintained constant for a given load as the conveyor inclination is changed.

A suitable clinometer is the ACCUSTAR analog electronic clinometer manufactured by Sperry, which generates an output potential linearly proportional to inclination through an angular range of + or −60 degrees. This linear output may be converted to the required arccosine function by a trigonometric function generator such as the AD639 integrated circuit from Analog Devices, with its pins strapped appropriately in accordance with the manufacturer's published literature.

In use, once calibrated, the output signals from the unit 28 on cable 30 to the integrator 26 will produce proportional to the weight of material on the weigh bridge and independent of the angle of inclination of the conveyor. Correct output from the weigh bridge can thus be asured, even if the inclination of the conveyor is altered during use.

Various changes and modifications are possible without departing from the scope of the invention as set forth in the appended claims. The weigh bridge unit 18 may be varied as discussed in the Kemp patent, for example by incorporating more than one idler (although a single idler unit will normally be preferred for compactness and simplicity), or an alternative design of weigh bridge may be employed provided that it is not sensitive to force components acting parallel to the direction of movement of the conveyor, can be operated at different inclinations without recalibration, and is sufficiently robust to stand up to operation at substantial inclinations and in adverse environments.

Similarly, the components of the unit 28 can be differently located. Only the clinometer 36 needs to be directly mechanically associated with the conveyor, and the remaining components could be located separately, or combined with the weigh bridge preamplifier or the belt scale integrator.

In the embodiment described, the excitation potential applied to the strain guages is modulated to compensate for conveyor inclination. This has advantages in arrangements such as that shown, where separate output signals from two strain gauges are applied to the integrator unit 26, since only one signal need be modulated rather than two. However, it is possible to rather than the input excitation potential should such an arrangement prove convenient. Furthermore, and depending on the trignometric function generator chip employed, it may be possible to carry out the multiplication function in the same chip.

We claim:

1. A conveyor weigh scale comprising a weigh bridge supporting a portion of the run of moving conveyor belt and secured to structure for supporting same at a range of different inclinations, said weigh bridge providing an output signal proportional to that component of said belt portion which is perpendicular to its direction of movement, a clinometer secured to said supporting structure and providing an output related to the inclination to the horizontal of said structure and thus said belt portion, and computing means receiving said clinometer signals and modulating said weigh bridge output signal therewith to maintain said weigh bridge output signal in constant proportion to the weight of said material.

2. A conveyor weigh scale according to claim 1, wherein the weigh bridge comprises support means for supporting a section of a conveyor belt run, said support means extending transversely of a line of travel of said run, a frame member extending transversely relative to the conveyor belt run for supporting the weigh bridge in a fixed relationship to said line of travel, and transversely spaced cantilever strain gauge bridge units between the frame member and opposite ends of the support means, said units being responsive to vertical components of forces applied thereto by the support means, said units providing the sole support for said support means, the support means being supported by the units perpendicularly above the frame member.

3. A conveyor weigh scale according to claim 1, wherein the computing means comprises a trigonometrical function generator for receiving the output signal from the clinometer and generating an output proportional to the secant of the inclination of the conveyor to the horizontal, and a multiplier receiving the function generator output and acting as a modulator in series with the weigh bridge.

4. A conveyor weigh scale according to claim 3, wherein the weigh bridge incorporates multiple strain gauges, and the computing means modulates the weigh bridge output by controlling an excitation potential applied to the strain gauges.

* * * * *